March 17, 1959     C. E. FOSTER     2,877,686
ADJUSTABLE REARVIEW MIRROR
Filed June 2, 1955

Carl E. Foster,
Inventor.
Koenig and Pope,
Attorneys.

United States Patent Office

2,877,686
Patented Mar. 17, 1959

2,877,686

ADJUSTABLE REARVIEW MIRROR

Carl E. Foster, St. Charles, Mo.

Application June 2, 1955, Serial No. 512,724

11 Claims. (Cl. 88—98)

This invention relates to a rearview mirror and more particularly to an adjustable rearview mirror structure for motor vehicles.

Briefly, the invention is directed to a rearview mirror structure for a motor vehicle comprising a support adapted to be affixed to a motor vehicle and a mirror mounted on the support for rotation on a substantially vertical axis, means for rotating the mirror in one direction or the other while preventing rotation of the mirror in the wind including a speed-reducing mechanism having an input and an output means, said mechanism being irreversible from its output to its input, electric motor means being connected to the input, the output being connected to the input, the output being connected to the mirror, and remote control means adapted to be mounted within the vehicle for selectively energizing the electric motor means to drive said mirror through said speed-reducing means in one direction or the other. The invention also encompasses a rearview mirror structure for motor vehicles which includes a casing mounted on a support for rotation, the casing being fitted with a mirror and containing a rotator assembly and remote control means mounted within the vehicle for selectively actuating the rotator assembly to drive the casing in one direction or the other.

Among the several objects of this invention may be noted the provision of a rearview mirror structure for motor vehicles in which the mirror can be readily and accurately positioned by the driver from within the vehicle; the provision of such a mirror structure which will remain fixed in any selected position and be unaffected by the relative motion of the vehicle and the wind; and the provision of a rearview mirror structure in which the mechanical and electrical elements which comprise a rotator assembly are contained inside the casing to form a durable integral unit which can be readily attached to a support mounted on the motor vehicle. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a plan view of a rearview mirror structure of the present invention;

Corresponding reference characters indicate corresponding parts throughout the several views of the drawings.

Figure 1:
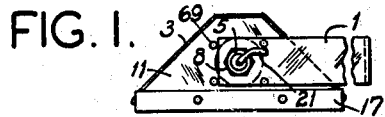
Figure 2:
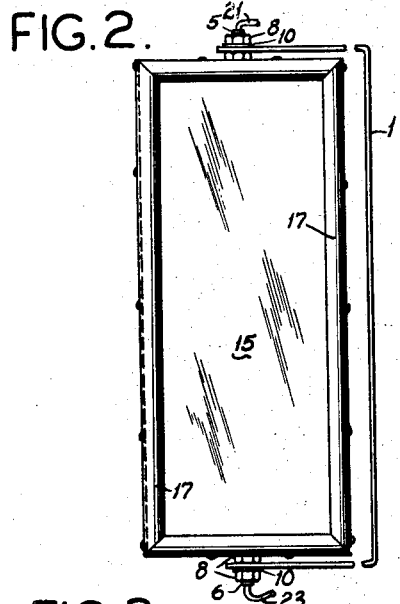
Fig. 2 is an elevation of the rearview mirror structure.

Referring now to the drawings, a support or bracket adapted to be affixed to a motor vehicle, such as a tractor trailer or a bus, is indicated at reference numeral 1. This bracket 1 is of C-shape. A trough-shaped casing 3 is mounted for rotation within support 1 by means of a pair of hollow threaded extensions 5 and 6 and nuts and washers 8 and 10. Extensions 5 and 6 constitute integral portions of an upper fixed pivot member 7 and a lower fixed pivot member 9, respectively. Casing 3 is provided with an upper end plate 11 and a lower end plate 13. A mirror 15 is affixed to the casing by means of a retaining ring or bezel 17.

A rotator assembly indicated generally by reference numeral 19 is contained within casing 3. This assembly 19 includes a pair of electric motors M–1 and M–2 and a speed-reducing mechanism. Motors M–1 and M–2 are preferably identical D. C. type motors operable from a low-voltage D. C. source, such as 6 or 12 volts. These motors are positioned in a coaxial, opposed, spaced-apart, rigid relationship by means of spacing pillars 25. Nuts 27 engage the threaded portions of pillars 25 thereby functioning to adjust the spacing between these motors and to clamp together their stator components. The threaded outer ends of pillars 25 are received by spaced bores in each of the fixed pivot members 7 and 9. Nuts 29 are utilized to affix this motor and pillar assembly to pivot members 7 and 9. Each of these pivot members 7 and 9 includes a central axial bore 30 and 32, respectively, which serve as conduits for motor wires 21 and 23, respectively. Armature shafts 37 and 39 are interconnected by means of a screw or threaded rod 31 and couplings 33 and 35. This threaded rod 31 constitutes an input to the speed-reducing mechanism component of the rotator assembly 19.

The speed-reducer mechanism includes a crosshead, generally indicated at numeral 41. The crosshead slides on spacing pillars 25 and has an internally threaded bore engageable with threaded rod 31. The crosshead 41 carries a slider 43 pivoted on a bolt stud 45. An actuator 47 is adjustably mounted by bolts 49 on the opposite surface of crosshead 41. Actuator 47 also includes a bolt 51 and a lock nut 53 which serve as an adjustable striker for coaction with a limit switch LS–2.

Switch LS–2 is mounted on the frame of motor M–2 and electrically interconnected to it by a wire 55. A second limit switch LS–1 is similarly mounted on the frame of motor M–1 and positioned so as to be actuated by the upper surface of actuator 47. These limit switches are normally closed. A wire 57 electrically interconnects motor M–1 and switch LS–1.

Slider 43 is movable within a spiral slot 61 of a cylindric housing 63. This housing 63 constitutes an output member of the speed-reducer mechanism of the rotator assembly 19. The ends of housing 63 are fitted with an upper bearing 65 and a lower bearing 67. The housing 63 and bearings 65 and 67 are rigidly secured to the end plates 11 and 13 by means of bolts 69. The inner peripheries of bearings 65 and 67 are dimensioned to receive the shoulders of fixed pivot members 7 and 9, respectively, so that the casing 3 is journalled for rotation about a substantially vertical axis represented by the threaded extensions 5 and 6. A washer 71 is carried by extension 5 and a similar washer 73 is carried by extension 6. These washers provide a cover for the bearing surfaces between the shoulder of member 7 and bearing 65 and the shoulder of member 9 and bearing 67, respectively. They also function to avoid any drag between the input and output of the speed-reducer mechanism that might be caused if nuts 8 were backed off too far.

Figure 7:
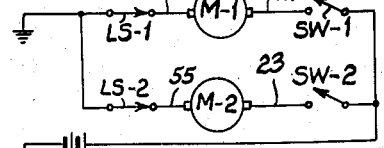

The electrical circuit of the rearview mirror structure (Fig. 7) provides for the interconnection of motors M–1 and M–2 with a vehicle storage battery B and two remote control switches SW–1 and SW–2. Battery B may be of any of the conventional low-voltage types, e. g., 6 volts or 12 volts. Switches SW–1 and SW–2 may be located anywhere within the vehicle but are preferably located so that the driver may conveniently and selectively actuate them either by hand or by foot. These switches may be of any of the conventional types, including momentary contact and snap-acting switches.

Figure 4:
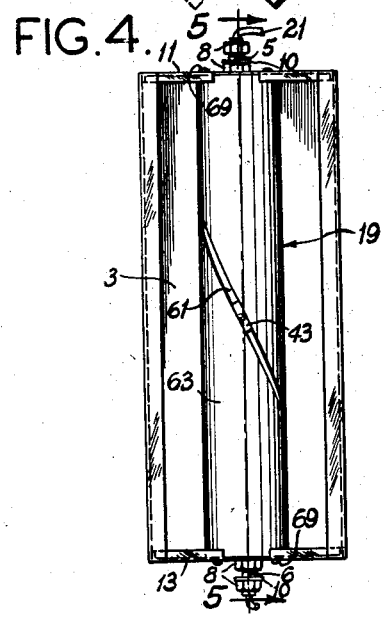
Fig. 4 is an elevation of the assembly with the mirror and its retaining rim removed.
Figures 5, 6:
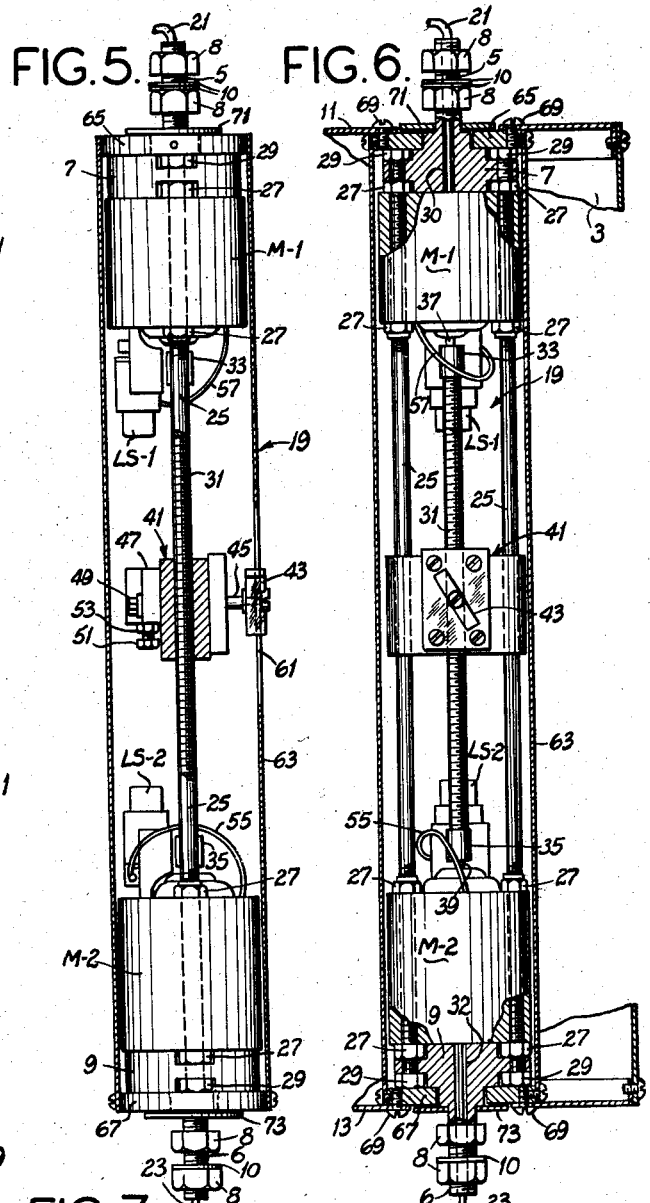
Fig. 5 is an enlarged central vertical section taken on line 5—5 of Fig. 4.
Fig. 6 is a view taken from the right of Fig. 5 with parts broken away and shown in section; and, Fig. 7 is a diagram of the electric circuit arrangement of the motors and switches associated with the mirror structure.

Operation is as follows:

The rearview mirror unit comprising casing 3, mirror 15, rotator assembly 19 and other associated components are mounted for turning movement on support 1, the initial alignment of the unit being established by tightening nuts 8 and washers 10 against support 1. Preferably, the unit should be positioned so that the mirror faces the rear of the motor vehicle and is in a vertical plane transverse a longitudinal axis (as shown in Fig. 1) of the motor vehicle when the slider 43 is centrally located on rod 31 as shown in Figs. 4–6.

Figure 3:
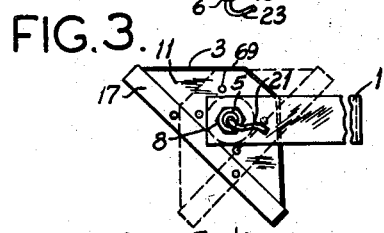
Fig. 3 is a plan view showing alternate positions of the mirror.

Upon actuation of switch SW–1 by the driver from within the motor vehicle, motor M–1 is energized to drive the input member, rod 31, in such a way as to move crosshead 41 upwardly. As the frame of motor M–1 and pillars 25 are fixed in relation to the support 1, the reaction of slider 43 within spiral slot 61 causes housing 63 to move in a counterclockwise direction (as viewed from the top) toward the dotted-line position indicated in Fig. 3.

The relative pitch of the threads of rod 31 and of the spiral 61 provide a high degree of speed reduction. Thus, the unit can be very slowly and accurately moved to any position between that shown in Fig. 1 and that shown in the dotted-line position of Fig. 3 by selective actuation of switch SW–1. If switch SW–1 is kept closed for a long enough period of time, crosshead 41 will continue to move upwardly until the upper surface of actuator 47 strikes switch LS–1 thereby breaking the electric circuit of M–1. This establishes the limit of rotation of the mirror unit in a counterclockwise direction.

In a similar fashion, operation of switch SW–2 to a closed position will energize motor M–2, rotating rod 31 so as to move crosshead 41 in a downward direction. Housing 63 is thereby caused to rotate and move casing 3 in a clockwise direction toward the solid-line position of Fig. 3. Again, as described in regard to operation of motor M–1 and switch LS–1, if energization of motor M–2 is continued actuator 47 will engage limit switch LS–2, thereby opening the electrical circuit to motor M–2. The limits of this slow oscillatory movement between the dotted-line and solid line positions of Fig. 3 can be conveniently established by adjusting bolts 49 and 51. Alternate operation of both switches SW–1 and SW–2 provides close position control of the mirror assembly to any desired alignment.

Because the relative motion of the vehicle and the wind applies considerable rotational force on casing 3, it will tend to rotate about its axis on support 1. This tendency is overcome by the arrangement of the speed-reducing mechanism described herein, which is irreversible from its output to its input. That is, rotation of casing 3 is not tranlatable into rotation of screw 31.

By arranging the remote control switches SW–1 and SW–2 convenient to the driver's hands or feet, it will be seen that the alignment of the rearview mirror, particularly one on the right side of the vehicle, can be continuously or intermittently modified during maneuvering of the vehicle, such as backing a tractor trailer into a loading dock. Moreover, because no mechanical linkages are necessary between the driver's position and the mirror, the installation of a rearview mirror structure of the present invention is quite simple. This is because the wires between switches SW–1 and SW–2 and motors M–1 and M–2 can be conveniently extended or shortened and routed in a manner that could not be accomplished with mechanical linkages.

It will be understood that a single reversible motor may be utilized in place of separate motors M–1 and M–2. Also, it will be noted that speed-reducing mechanisms other than the threaded rod, crosshead and housing structure illustrated herein may be employed, as long as the mechanism is irreversible from its input to its output, or the reduction ratio is sufficiently great so that the usual wind forces encountered will not move the mirror structure relative to the support. Varying degrees of speed reduction can be utilized. Preferably, however, the rotational speed of casing 3 should be in the order of a few R. P. M. This permits fine positioning and small increments of change.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A rearview mirror structure for a motor vehicle comprising a support adapted to be affixed to a motor vehicle, a casing mounted on the support for rotation on a substantially vertical axis, a mirror affixed to said casing at the front thereof in a plane substantially parallel to said axis, means contained within the casing in back of the mirror for rotating the casing and mirror in one of two directions opposite to each other, said means including electric motor means fixed to said support, a speed-reducing mechanism having an input and an output means, said electric motor means being connected to said input means and said output means being connected to said casing whereby said casing and mirror may be driven by said motor means through said speed-reducing mechanism for rotation on said axis, and remote control switch means mounted within the vehicle for selectively energizing the electric motor means to drive said casing and mirror in one of two directions opposite to each other.

2. A rearview mirror structure as set forth in claim 1 wherein the speed-reducing mechanism is irreversible from its output to its input means for preventing rotation of the casing and mirror in the wind.

3. A rearview mirror structure as set forth in claim 1 which further includes limit switch means in the said casing associated with said speed-reducing mechanism whereby rotation of the casing and mirror in one of the two opposite directions past predetermined limiting positions will deenergize said electric motor means.

4. A rearview mirror structure as set forth in claim 1 wherein said remote control switch means comprises first and second electrical switches, said first switch adapted when actuated to energize said motor means to drive said casing and mirror in one direction, said second switch adapted when actuated to drive the casing and mirror in the opposite direction.

5. A rearview mirror structure for a motor vehicle comprising a support adapted to be affixed to a motor vehicle, a casing mounted on the support for rotation on a substantially vertical axis, a mirror affixed to said casing at the front thereof in a plane substantially parallel to said axis, a rotator assembly contained within said casing in back of the mirror, said assembly including a curved housing affixed to the casing extending parallel to said axis, said housing having a spiral slot, a slider movable within said slot, a screw extending in the direction of said axis for driving said slider, electric motor means fixed to said support for driving the screw and thereby driving said slider in said slot to rotate the casing and mirror at a reduced speed, and remote control means mounted within the vehicle for selectively energizing the electric motor means to drive said casing and mirror in one of two directions opposite to each other.

6. A rearview mirror structure for a motor vehicle comprising a support adapted to be affixed to a motor vehicle, a casing mounted on the support for rotation on a substantially vertical axis, a mirror affixed to said casing at the front thereof in a plane substantially parallel to said axis, a rotator assembly contained within said casing in back of the mirror, said assembly including a hollow cylindrical housing coaxially affixed to the casing, said housing having a spiral slot, electric motor means mounted within said housing and fixed to said support, a slider, a screw extending axially in said housing adapted to be driven by said motor means to move said slider in said slot and thereby axially rotate the casing and mirror at reduced speed, and remote control means mounted within the vehicle for selectively energizing the electric motor means to drive said casing and mirror in one of two directions opposite to each other.

7. A rearview mirror structure for a motor vehicle comprising a support adapted to be affixed to a motor vehicle, a casing mounted on the support for rotation on a substantially vertical axis, a mirror affixed to said casing at the front thereof in a plane substantially parallel to said axis, a rotator assembly contained within said casing in back of the mirror, said assembly including a curved housing coaxially affixed to the casing, said housing having a spiral slot, first and second electric motors mounted in an opposed coaxial relationship within said housing and fixed to said support, a screw connected between said motors and adapted to be driven alternately by one of said motors, a slider actuable by said screw and adapted to be moved within said slot to axially rotate the casing and mirror at a reduced speed, and remote control means mounted within the vehicle for selectively energizing said first motor to drive said casing and mirror in one direction and to energize the second electrical motor to drive said casing and mirror in the opposite direction.

8. A rearview mirror structure as set forth in claim 7 which further includes first and second limit switches associated respectively with said first and second motors, said first limit switch being responsive to movement of said slider past a first predetermined position to deenergize said first electric motor, and said second limit switch being responsive to movement of said slider past a second predetermined position to deenergize said second electric motor.

9. A rearview mirror structure as set forth in claim 8 wherein said remote control means comprise first and second electrical switches, said first switch adapted when actuated to energize said motor means to drive said casing and mirror in one direction, said second switch adapted when actuated to drive the casing and mirror in the other direction.

10. A rearview mirror structure for a motor vehicle comprising a C-shaped bracket adapted to be mounted on a vehicle, an assembly comprising a first and a second electric motor held in coaxial, axially spaced opposed positions by means of spacer members, said assembly extending between the ends of the upper and lower portions of the C-shaped bracket and fixed to said bracket, a screw extending axially between the motors and connected thereto and adapted to be driven in one direction by one motor and in the opposite direction by the other motor, a cylindrical housing surrounding said assembly and mounted for rotation relative to said assembly and bracket about the axis of said motors and said screw, said housing having a spiral slot, a slider having a threaded connection with said screw and a portion extending into said slot, a casing fixed to and enclosing said housing, and a rearview mirror fixed to said casing in a plane substantially parallel to said axis.

11. A rearview mirror structure as set forth in claim 10 further comprising first and second limit switches mounted on the first and second motors, respectively, and engageable by the slider for controlling the motors.

References Cited in the file of this patent

UNITED STATES PATENTS

| | | |
|---|---|---|
| 441,067 | Henderson | Nov. 18, 1890 |
| 708,727 | Nather | Sept. 9, 1902 |
| 1,139,795 | Overfield et al. | May 18, 1915 |
| 1,176,913 | Lonier | Mar. 28, 1916 |
| 1,641,167 | Hannig | Sept. 6, 1927 |
| 2,307,479 | Annick | Jan. 5, 1943 |
| 2,573,127 | Von Bredow et al. | Oct. 30, 1951 |
| 2,718,175 | Gim | Sept. 20, 1955 |

FOREIGN PATENTS

| | | |
|---|---|---|
| 381,418 | France | of 1908 |